United States Patent
Jiang et al.

(10) Patent No.: US 11,755,429 B2
(45) Date of Patent: Sep. 12, 2023

(54) METHOD, ELECTRONIC DEVICE, AND PROGRAM PRODUCT FOR PRESENTING I/O WRITE RECORDS

(71) Applicant: EMC IP Holding Company LLC, Hopkinton, MA (US)

(72) Inventors: Changxu Jiang, Chengdu (CN); Fei Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 17/530,994

(22) Filed: Nov. 19, 2021

(65) Prior Publication Data

US 2022/0342776 A1    Oct. 27, 2022

(30) Foreign Application Priority Data

Apr. 23, 2021  (CN) .......................... 202110442563.6

(51) Int. Cl.
*G06F 11/14* (2006.01)
*G06F 11/30* (2006.01)
*G06F 11/32* (2006.01)

(52) U.S. Cl.
CPC ...... *G06F 11/1469* (2013.01); *G06F 11/1451* (2013.01); *G06F 11/1461* (2013.01); *G06F 11/1464* (2013.01); *G06F 11/3034* (2013.01); *G06F 11/323* (2013.01); *G06F 2201/84* (2013.01)

(58) Field of Classification Search
CPC ............. G06F 11/1469; G06F 11/1451; G06F 11/1461; G06F 11/1464; G06F 11/3034; G06F 11/323; G06F 2201/84

USPC .......................................................... 714/6.3
See application file for complete search history.

(56) References Cited

U.S. PATENT DOCUMENTS

| | | | |
|---|---|---|---|
| 7,747,988 B2 | 6/2010 | Zhu et al. | |
| 7,792,661 B1 | 9/2010 | Cooley et al. | |
| 10,489,005 B2 | 11/2019 | Grover et al. | |
| 10,740,361 B2 | 8/2020 | Zhang et al. | |
| 2015/0378870 A1* | 12/2015 | Marron | G06F 11/362 717/128 |
| 2018/0260302 A1* | 9/2018 | Mola | G06F 16/9038 |
| 2019/0371048 A1* | 12/2019 | Su | G06T 15/503 |

* cited by examiner

*Primary Examiner* — Yair Leibovich
(74) *Attorney, Agent, or Firm* — BainwoodHuang

(57) ABSTRACT

Embodiments of the present disclosure relate to a method, an electronic device, and a computer program product for presenting I/O write records. The method includes: obtaining I/O write records for a file system within a time period; dividing the time period into a plurality of consecutive sub-time-periods based on a predetermined time interval; determining a plurality of I/O write numbers associated with the plurality of sub-time-periods based on the I/O write records; and graphically presenting the plurality of I/O write numbers in chronological order. Using the technical solution of the present disclosure, changes in the I/O write numbers over time can be presented to a user in a chronological, intuitive, and easily recognizable manner, so that the user can easily find a changing law of the I/O write numbers over time, and can further select data protection forms and schedules to be adopted, thereby improving user experience of the user with needs for data analysis and data protection.

20 Claims, 5 Drawing Sheets

METHOD, ELECTRONIC DEVICE, AND PROGRAM PRODUCT FOR PRESENTING I/O WRITE RECORDS

CROSS-REFERENCE TO RELATED APPLICATION

This application claims priority to Chinese Patent Application No. CN202110442563.6, on file at the China National Intellectual Property Administration (CNIPA), having a filing date of Apr. 23, 2021, and having "A METHOD FOR PRESENTING A RECORD OF I/O WRITES, AN ELECTRONIC DEVICE, AND A COMPUTER PROGRAM PRODUCT" as a title, the contents and teachings of which are herein incorporated by reference in their entirety.

TECHNICAL FIELD

Embodiments of the present disclosure generally relate to the computer technology, and in particular, to a method, an electronic device, and a computer program product for presenting I/O write records, which can be used in the data analysis field, the data protection field, and other fields.

BACKGROUND

A snapshot scheduler is designed to ensure effective protection of data. The snapshot scheduler allows snapshots to be created according to a user-defined schedule. A user can create or modify the schedule, and then create snapshots of those file systems associated with the schedule when appropriate. The snapshot scheduler is also responsible for evaluating the expiration time of existing snapshots and performing snapshot deletion operations on expired snapshots. The snapshot scheduler supports certain user-defined attributes associated with generation and deletion of the snapshots. For example, the user can control the creation frequency and retention time of the snapshots by setting parameters of the snapshot scheduler, so that the functions provided by a snapshot system can functionally meet requirements of different protection levels.

The user can set the parameters of the snapshot scheduler, and often wants to be able to understand data changes of file systems that need to create snapshots. The data changes of the file systems can be embodied by I/O write situations for the file systems, for example. However, in traditional technologies, there are no corresponding methods to support intuitive and easily recognizable presentations of the I/O write situations for the file systems to the user, which makes it difficult for the user to easily learn the I/O write situations to set the parameters of the snapshot scheduler, leading to a decline in user experience of the user with needs for data analysis and data protection.

SUMMARY OF THE INVENTION

Embodiments of the present disclosure provide a method, an electronic device, and a computer program product for presenting input/output (I/O) write records.

In a first aspect of the present disclosure, a method for presenting I/O write records is provided. The method includes: obtaining I/O write records for a file system within a time period; dividing the time period into a plurality of consecutive sub-time-periods based on a predetermined time interval; determining a plurality of I/O write numbers associated with the plurality of sub-time-periods based on the I/O write records; and graphically presenting the plurality of I/O write numbers in chronological order.

In a second aspect of the present disclosure, an electronic device is provided. The electronic device includes: at least one processing unit; and at least one memory. The at least one memory is coupled to the at least one processing unit and stores instructions for execution by the at least one processing unit. The instructions, when executed by the at least one processing unit, cause the device to perform actions, including: obtaining I/O write records for a file system within a time period; dividing the time period into a plurality of consecutive sub-time-periods based on a predetermined time interval; determining a plurality of I/O write numbers associated with the plurality of sub-time-periods based on the I/O write records; and graphically presenting the plurality of I/O write numbers in chronological order.

In a third aspect of the present disclosure, a computer program product is provided. The computer program product is tangibly stored on a non-transitory computer-readable medium and includes machine-executable instructions. The machine-executable instructions, when executed, cause a machine to perform any step of the method described according to the first aspect of the present disclosure.

The Summary of the Invention section is provided to introduce the selection of concepts in a simplified form, which will be further described in the Detailed Description below. The Summary of the Invention section is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent by describing example embodiments of the present disclosure in more detail in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Figure 1:
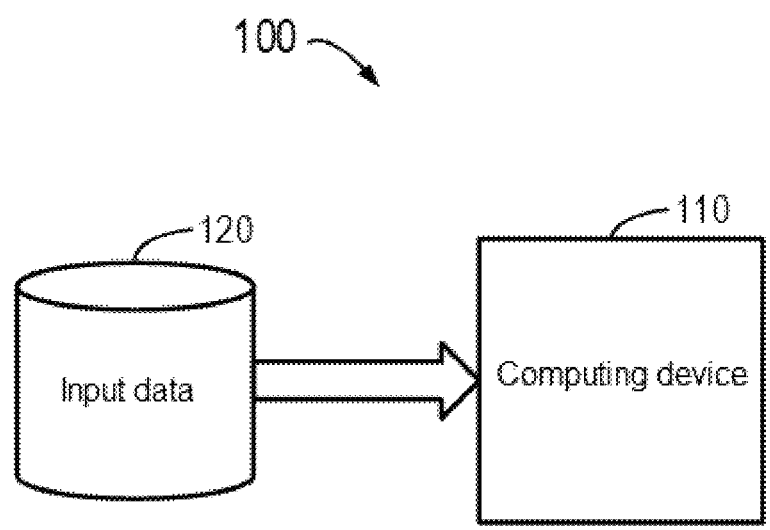
FIG. 1 shows a schematic diagram of environment 100 for presenting I/O write records, in which a device and/or a method according to an embodiment of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred embodiments of the present disclosure will be described in more detail with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

The creation frequency of snapshots for a file system and the retention time of the snapshots affect the number of snapshots maintained for the file system. Inappropriate snapshot scheduling for the file system may lead to the following disadvantages: first, configuring a low snapshot acquisition frequency for data changes may result in insufficient protection of the file system; conversely, configuring a high snapshot generation frequency may cause too many snapshots to be retained on the system, especially if a customer needs to keep the snapshots for a long time. On the one hand, setting the high snapshot creation frequency for a file system with a low frequency or sparse data changes will cause a large number of snapshots to be repeated. On the other hand, the number of snapshots that can be created for a file system is limited, which makes it difficult to keep a long retention time of the created snapshots under a high-frequency snapshot capture schedule. To make matters worse, too many snapshots on a system will affect the failover time and the like.

Different file systems have their own data change patterns because a user may use them for different applications. For example, some file systems are written hourly, some are written daily, some are written monthly, and the like. Therefore, if the user can understand the rules of change of file system data, it will help the user to set parameters of the snapshot scheduler more reasonably. However, in traditional technologies, there are no corresponding methods to support intuitive and easily recognizable presentations of I/O write situations for the file systems to the user, which makes it difficult for the user to easily learn the I/O write situations to set the parameters of the snapshot scheduler, leading to a decline in user experience of the user with needs for data analysis and data protection.

In order to at least partially solve the above-mentioned problems and one or more of other potential problems, the embodiments of the present disclosure provide a method for presenting input/output (I/O) write records. Using this method, changes in I/O write numbers over time can be presented to a user in a chronological, intuitive, and easily recognizable manner, so that the user can easily find a changing law of the I/O write numbers over time, and can further select data protection forms and schedules to be adopted. It should be pointed out that I/O write involved in the present disclosure may include writing new data into a file system and modifying existing data in the file system to make changes to files in the file system.

FIG. 1 shows a schematic block diagram of environment 100 for presenting I/O write records, in which a method for presenting the I/O write records in some embodiments of the present disclosure may be implemented. According to the embodiment of the present disclosure, environment 100 for presenting the I/O write records may be a cloud environment.

As shown in FIG. 1, environment 100 for presenting the I/O write records includes computing device 110. Environment 100 for presenting the I/O write records includes, for example, input data 120 for I/O write records of a file system in a time period, provided to computing device 110 as input of computing device 110. According to the embodiment of the present disclosure, input data 120 may further include a time interval desired to present the I/O write records, a predetermined I/O write mode for the file system, and the like.

After receiving input data 120, computing device 110 may process input data 120. For example, computing device 110 may use the I/O write records included in input data 120 to divide the time period into a plurality of consecutive sub-time-periods based on a predetermined time interval. Then, computing device 110 may determine a plurality of I/O write numbers associated with the plurality of sub-time-periods based on the I/O write records. Finally, computing device 110 may use its data presentation function to graphically present the plurality of I/O write numbers in chronological order, or output related data to a presentation apparatus (not shown) for presentation.

In environment 100 for presenting the I/O write records as shown in FIG. 1, the provision of input data 120 to computing device 110 may be performed through a network. Further, in the embodiment of the present disclosure, the description is given by taking computing device 110 as an example, and computing device 110 may include any physical or virtual central processing unit, dedicated processing unit, proprietary accelerator, and the like. However, the protection scope of the present disclosure is not limited thereto, but may be applied to various computing elements, units, modules, or systems that can provide input and output processing capabilities.

It should be understood that environment 100 for presenting the I/O write records is only illustrative and not restrictive, and it is extensible or shrinkable. For example, environment 100 for presenting the I/O write records may include more computing devices 110, and more input data 120 may be provided to computing devices 110 as input, thereby meeting demands of more users using more computing devices 110 to simultaneously or non-simultaneously process more input data 120.

Figure 2:
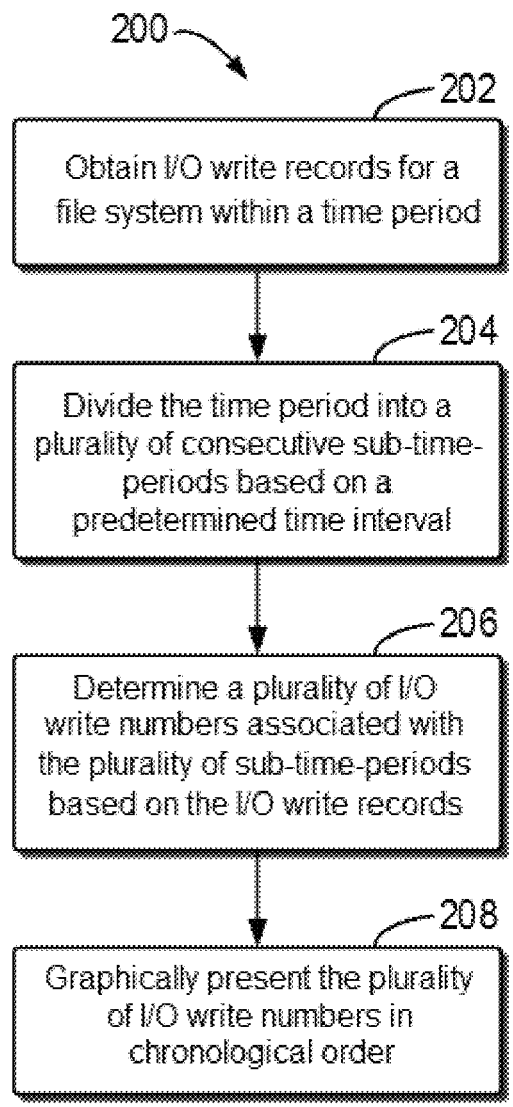
FIG. 2 shows a flowchart of method 200 for presenting I/O write records according to an embodiment of the present disclosure.
Figure 3:
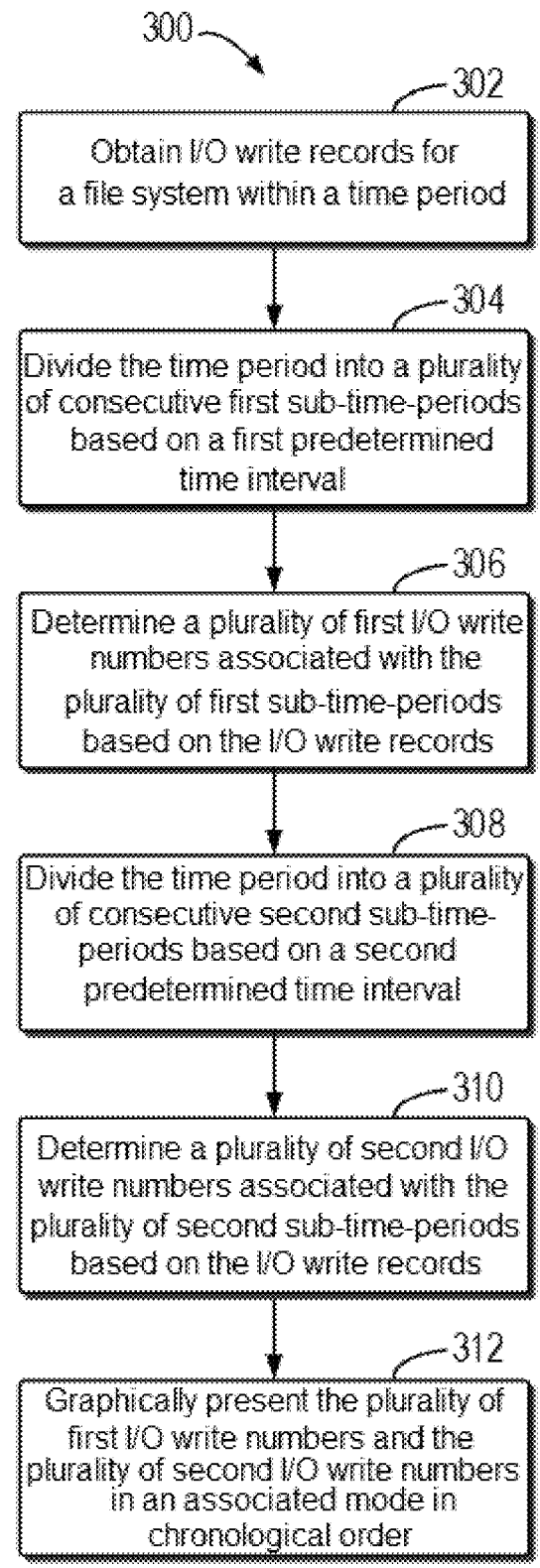
FIG. 3 shows a flowchart of method 300 for presenting I/O write records according to an embodiment of the present disclosure.

The following takes computing device 110 and input data 120 included in FIG. 1 as an example to illustrate method 200 for presenting I/O write records and method 300 for presenting I/O write records shown in FIG. 2 and FIG. 3.

FIG. 2 shows a flowchart of method 200 for presenting I/O write records according to an embodiment of the present disclosure. Method 200 may be implemented by computing device 110 shown in FIG. 1 or by other appropriate devices. It should be understood that method 200 for presenting the I/O write records may also include additional steps that are not shown and/or may omit the shown steps, and the scope of the embodiments of the present disclosure is not limited in this aspect.

In block 202, computing device 110 obtains the I/O write records for the file system within the time period included in input data 120. According to the embodiment of the present disclosure, the I/O write records for the file system may indicate at which time points an I/O write operation is performed for the file system, and computing device 110 may obtain the I/O write records from performance index records for the file system.

In block 204, computing device 110 divides the time period into a plurality of consecutive sub-time-periods based on a predetermined time interval. According to the embodiment of the present disclosure, the predetermined time interval may include, for example, one second or more seconds, one minute or more minutes, one hour or more hours, one day or more days, and the like. For example, if the time period is one hour, the one-hour time period may be divided into 60 sub-time-periods based on a predetermined time interval of 1 minute, and each sub-time-period is 1 minute.

According to some embodiments of the present disclosure, computing device 110 may divide the time period into a plurality of consecutive sub-time-periods according to the predetermined time interval, such as 1 minute, 5 minutes, 15 minutes, and 1 hour.

According to some other embodiments of the present disclosure, computing device 110 may divide the time period into a plurality of consecutive sub-time-periods according to the predetermined time interval included in data 120, for example, provided by the user.

According to still some other embodiments of the present disclosure, computing device 110 may determine the predetermined time interval according to a length of the time period covered by the I/O write records for the file system and according to a preset rule, thereby dividing the time period into the plurality of consecutive sub-time-periods. For example, the preset rule may include that 1 hour is used as the predetermined time interval if the length of the time period is more than 1 day, or 1 minute or more minutes are used as the predetermined time interval if the length of the time period is less than 5 hours.

According to still some other embodiments of the present disclosure, computing device 110 may determine the predetermined time interval based on a predetermined I/O write mode for the file system, where the predetermined I/O write mode indicates a time during which I/O write is allowed. For example, if the predetermined I/O write mode indicates that the time during which I/O write is allowed is from 0 am to 1 am every day, computing device 110 may determine the predetermined time interval as 1 day or 1 hour, or if the predetermined I/O write mode indicates that the time during which I/O write is allowed is any time, computing device 110 may determine the predetermined time interval as 1 minute.

In block 206, computing device 110 may determine a plurality of I/O write numbers associated with the plurality of sub-time-periods based on the I/O write records. According to the embodiment of the present disclosure, if the time period is 1 hour and each sub-time-period is 1 minute, computing device 110 will determine the I/O write numbers in every minute within the 1 hour based on the I/O write records.

According to the embodiment of the present disclosure, computing device 110 may determine the plurality of I/O write numbers associated with the plurality of sub-time-periods by using aggregate sampling based on the I/O write records and the plurality of sub-time-periods. Aggregate sampling may also be referred to as weighted aggregate sampling. When weighted aggregate sampling is used, each grouped data can be compressed into a weighted value as an output element for a large number of grouped discrete data sets. Therefore, since the I/O write records record discrete I/O write events, and each sub-time-period that has been divided may be used as a group, the plurality of I/O write numbers associated with the plurality of sub-time-periods may be easily determined through aggregate sampling.

The following describes a specific example of a weighted aggregate sampling algorithm.

When using the weighted aggregate sampling algorithm, a weighted value as the output element may be obtained by multiplying the grouped discrete data set by a configurable weighted array W.

First, the following symbols are defined:

N: a length of source data;

$d_i$: the i-th data from time 0, where $i=1, \ldots, N$;

$ds_i$: I/O write at time i in each minute group, $i=1, \ldots, K$, where K is determined by an original data sampling interval;

$W_s$: a weight used to aggregate data under a second group, where $W_s=[w_{s1}, w_{s2}, \ldots, w_{sK}]^T$;

$dm_i$: weighted aggregate I/O write at time i in each hour group, $i=1, \ldots, K$, where K is determined by the original data sampling interval;

$W_m$: a weight used to aggregate data under a minute group, where $W_m=[w_{m1}, w_{m2}, \ldots, w_{mK}]^T$;

$dh_i$: weighted aggregate I/O write at time i hours in a daily group, where $i=1, \ldots, 24$;

$W_h$: a weight used to aggregate data under an hour, where $W_h=[w_{h1}, w_{h2}, \ldots, w_{hK}]^T$;

dd: weighted aggregate I/O write every day;

dw: weighted aggregate I/O write from Monday to Sunday in a weekly group.

$W_w$: a weight used to aggregate data in a week, where $W_w=[w_{w1}, w_{w2}, \ldots, w_{w7}]^T$;

dg: weighted aggregate I/O write in each month; and $W_d$: a weight used to aggregate data in a month, where $W_d=[w_{d1}, w_{d2}, \ldots, w_{s31}]^T$.

For the selected file system, the I/O write obtained from the performance index records is used as the original source data to map data changes on the file system. The original source data is made to start from time 0 by zero cutting or padding, and then the original source data is divided into several groups as samples.

In order to demonstrate states of data changes at different possible snapshot frequencies, the weighted aggregate sampling algorithm is used to compress the data changes into different time ranges.

A sample of a state of data changes obtained every minute: $dm=[ds_1, ds_2, \ldots, ds_K] \cdot W_s$ A sample of a state of data changes obtained every hour: $dh=[dm_1, dm_2, \ldots, dm_K] \cdot W_m$ A sample of a state of data changes obtained every day: $dd=[dh_1, dh_2, \ldots, dh_{24}] \cdot \overline{W}_h$ A sample of a state of data changes obtained every week, where dd is grouped to $dd_i$ from Monday to Sunday, corresponding to $i=1, \ldots, 7$: $dw=[dd_1, dd_2, \ldots, dd_7] \cdot \overline{W}_w$ A sample of a state of data changes obtained every month, where for $i=1, \ldots, 31$, ddi is $dg=[dd_1, dd_2, \ldots, dd_{31}] \cdot \overline{W}m$ grouped every month:

It should be pointed out that the original source data may be average I/O write based on a sampling interval, because it may be difficult to obtain the I/O write numbers every second. If the corresponding month does not have the i-th day, $dd_i$ is set to 0, for example, the 31st day of November. In addition, each weight matrix may be normalized as follows:

$$\overline{w}_i = \frac{w_i}{\sum_{i=1}^{L} w_i} \cdot L$$

where $W \in R^{L \times 1}$.

Then, possible snapshot frequency attributes may be recommended to or selected by the user:

interval: a time interval in hours for creating snapshots of objects attached to this snapshot plan.

timeOfday: a time point during a day when the snapshots of the objects attached to this snapshot plan are created.

daysOfweek: a list of days when the snapshots are created. This list is used with time Ofday.

daysOfmonth: a list of days of a month used to create the snapshots. This list is used with time Ofday.

For example, whether the hourly sample (dh) is sparse and repeats zero times may be checked; otherwise, the data changes frequently, and interval is recommended to use for setting. Then, whether the daily sample (dd) is sparse and repeats zero times may be checked; otherwise, timeOfday or interval is recommended to use for setting. After that, whether the weekly sample is sparse and repeats zero times may be checked; otherwise, it is recommended to combine timeOfday and daysOfweek to use for setting. Finally, the monthly sample is calculated and checked, and it is recommended to combine timeOfday and daysOfmonth to use for setting.

It should be understood that the setting of the parameters of the above weighted aggregate sampling algorithm is only an example, and the protection scope of the present application is not limited to this.

In block 208, computing device 110 graphically presents the plurality of I/O write numbers in chronological order. According to the embodiment of the present disclosure, graphically presenting the plurality of I/O write numbers may include first determining a plurality of colors associated with the plurality of I/O write numbers, and then using the plurality of colors to graphically present the plurality of I/O write numbers in chronological order, where different colors may be used to indicate different levels of the I/O write numbers. Specifically, it can be set so that a depth of a color among the plurality of colors is associated with a size of a corresponding I/O write number among the plurality of I/O write numbers. For example, if the time period is 1 hour and each sub-time-period is 1 minute, the corresponding color may be set to be black when the I/O write numbers in 1 minute is more than 100, the corresponding color may be set to be dark grey lighter than black when the I/O write numbers in 1 minute is 75-99, the corresponding color may be set to be grey lighter than dark grey when the I/O write numbers in 1 minute is 50-74, the corresponding color may be set to be light grey lighter than grey when the I/O write numbers in 1 minute is 25-49, and the corresponding color may be set to be white when the I/O write numbers in 1 minute is less than 24.

In addition, according to the embodiment of the present disclosure, computing device 110 may graphically present the plurality of I/O write numbers using the plurality of colors in at least one of the following forms: lines with colors; two-dimensional graphs with colors; and three-dimensional graphs with colors. For example, when computing device 110 uses the plurality of colors to graphically present the plurality of I/O write numbers in the form of the two-dimensional graphs with the colors, a square with a color may be generated for every 1 minute or every 1 hour as a sub-time-period, and the I/O write numbers in each sub-time-period are indicated by different colors of the squares.

According to the embodiment of the present disclosure, computing device 110 may first weight the plurality of I/O write numbers according to a predetermined weighting pattern, and then graphically present the plurality of weighted I/O write numbers, where the predetermined weighting pattern is associated with time. For example, for the purpose of reflecting that the I/O write numbers on every Monday are very important, the predetermined weighting pattern may apply a weight greater than 1 to the I/O write numbers recorded on every Monday, so that the I/O write numbers on every Monday may be more prominent during presentation. For another example, for the purpose of reflecting that the I/O write numbers from 0 am to 6 am every day are not important, the predetermined weighting pattern may apply a weight less than 1 and even equal to 0 to the I/O write numbers from 0 am to 6 am every day, so that the significance of the I/O write numbers from 0 am to 6 am every day may be lowered during presentation.

It can be seen that through method 200, the changes in the I/O write numbers over time may be graphically presented in chronological order by using different colors, so that the user can easily find the change law of the I/O write numbers over time.

According to the embodiment of the present disclosure, the I/O write records for the file system in the same time period may be divided according to different predetermined time intervals, and presented in association, so that more comprehensive data display can be presented to the user by presenting the same content by different time levels.

FIG. 3 shows a flowchart of method 300 for presenting I/O write records according to an embodiment of the present disclosure. Method 300 may be implemented by computing device 110 shown in FIG. 1 or by other appropriate devices. It should be understood that method 300 for presenting the I/O write records may also include additional steps that are not shown and/or may omit the shown steps, and the scope of the embodiments of the present disclosure is not limited in this aspect.

In block 302, computing device 110 obtains the I/O write records for the file system within the time period included in input data 120. The specific content of the step involved in block 302 is the same as that involved in block 202, and will not be repeated here.

In block 304, computing device 110 divides the time period into a plurality of consecutive first sub-time-periods based on a first predetermined time interval. The specific content of the step involved in block 304 is similar to that involved in block 204, and will not be repeated here.

In block 306, computing device 110 may determine a plurality of first I/O write numbers associated with the plurality of first sub-time-periods based on the I/O write records. The specific content of the step involved in block 306 is similar to that involved in block 202, and will not be repeated here.

In block 308, computing device 110 divides the time period into a plurality of consecutive second sub-time-periods based on a second predetermined time interval. According to the embodiment of the present disclosure, the second predetermined time interval is different from the first predetermined time interval. For example, if the first predetermined time interval is 1 minute, the second predetermined time interval may be 15 minutes, 1 hour, and the like. In block 310, computing device 110 divides the time period into a plurality of consecutive second sub-time-periods based on the second predetermined time interval. The specific content of the step involved in block 310 is similar to that involved in block 204 and will not be repeated here.

In block 312, computing device 110 graphically presents the plurality of first I/O write numbers and the plurality of second I/O write numbers in an associated mode in chronological order. According to the embodiment of the present disclosure, computing device 110 may graphically present the plurality of first I/O write numbers and the plurality of second I/O write numbers simultaneously in chronological order. For example, when the length of the time period is 1 day, computing device 110 may present the I/O write numbers in the predetermined time interval of 1 minute and 60×24=1440 sub-time-periods of the 1 minute on the left side of the displayed content, and present the I/O write numbers in the predetermined time interval of 1 hour and 24 sub-time-periods of the 1 hour on the right side of the displayed content.

In conjunction with the content of method 300, I/O write record presentation 400, I/O write record presentation 500, and I/O write record presentation 600 shown in FIG. 4 to FIG. 6 according to the embodiments of the present disclosure are described below in the form of simultaneously graphically presenting the plurality of first I/O write numbers and the plurality of second I/O write numbers.

Figure 4:
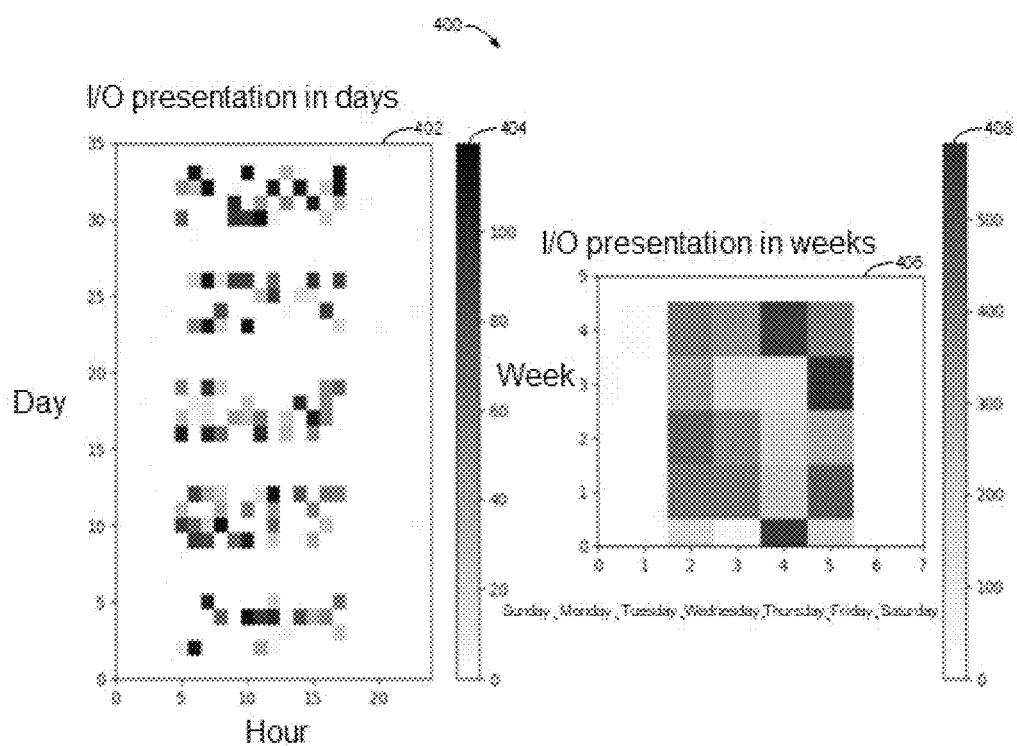
FIG. 4 shows a schematic diagram of I/O write record presentation 400 according to an embodiment of the present disclosure.

FIG. 4 shows a schematic diagram of I/O write record presentation 400 according to an embodiment of the present disclosure. According to the embodiment of the present disclosure, presentation 400 is aimed at a situation where the predetermined I/O write mode is mainly to perform write operations on the file system during working hours from Tuesday to Friday every week.

As shown in FIG. 4, sub-FIG. 402 is an I/O presentation in days, the abscissa is hours of each day, the ordinate is days, and sub-FIG. 404 is a comparison chart of the colors and the I/O write numbers to indicate the colors associated with different I/O write numbers, where the greater the I/O write numbers, the darker the colors. It can be seen from the abscissa of sub-FIG. 402 that the daily I/O write time is mainly concentrated in working hours. It can be seen from the ordinate of sub-FIG. 402 that there will be almost no I/O write for 2 days after every 5 days due to weekends.

Continuing referring to FIG. 4, sub-FIG. 406 is an I/O presentation in weeks, the abscissa is days of each week, the ordinate is weeks, and sub-FIG. 408 is a comparison chart of the colors and the I/O write numbers to indicate the colors associated with different I/O write numbers, where the greater the I/O write numbers, the darker the colors. It can be seen from the abscissa of sub-FIG. 406 that there is almost no I/O write on Saturday and Sunday of each week due to weekends. It can be seen from the ordinate of sub-FIG. 406 that there is not much regularity in the difference in the I/O write numbers between different weeks.

It can be seen that sub-FIG. 402 and sub-FIG. 406 are intuitive at different granularities, and the presentation of sub-FIG. 402 is more intuitive. Therefore, for this file system, sub-FIG. 402 and sub-FIG. 406 may be selected to be presented to the user at the same time, or only sub-FIG. 402 is presented to the user. After seeing presentation 400 in FIG. 4, the user may choose to create snapshots for the file system on weekends of each week or during non-working hours of each day, because the I/O write numbers in these periods are small, which will not affect normal running of the file system.

Figure 5:
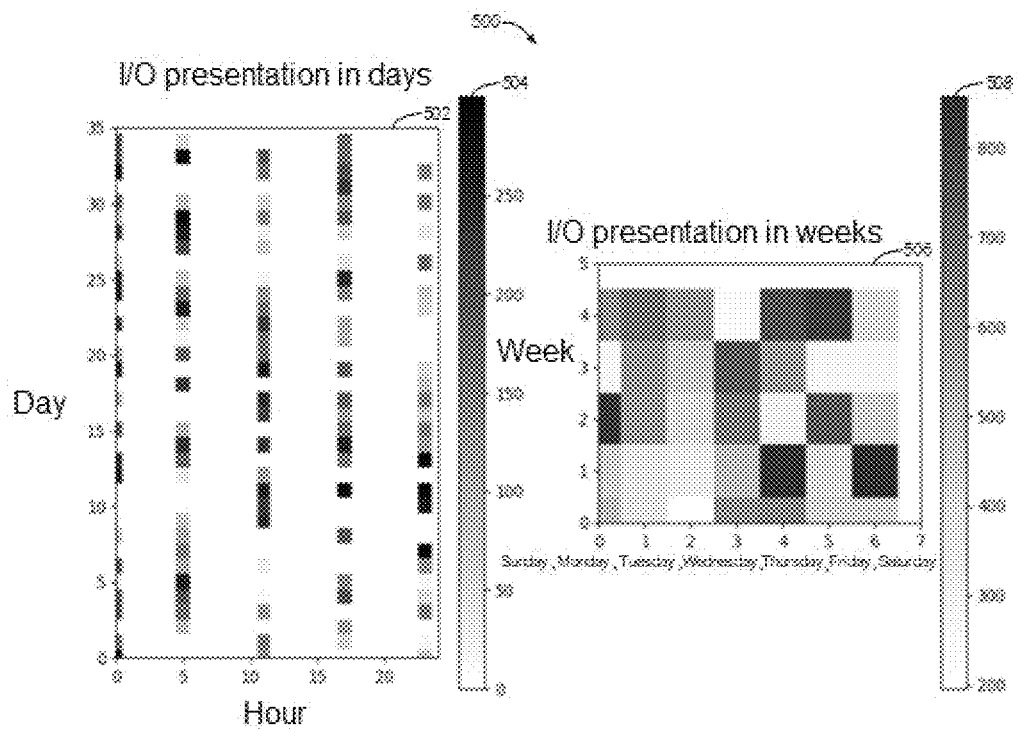
FIG. 5 shows a schematic diagram of I/O write record presentation 500 according to an embodiment of the present disclosure.

FIG. 5 shows a schematic diagram of I/O write record presentation 500 according to an embodiment of the present disclosure. According to the embodiment of the present disclosure, presentation 500 is aimed at a situation where the predetermined I/O write mode is a write operation in which data is backed up to the file system every 6 hours.

As shown in FIG. 5, sub-FIG. 502 is an I/O presentation in days, the abscissa is hours of each day, the ordinate is days, and sub-FIG. 504 is a comparison chart of the colors and the I/O write numbers to indicate the colors associated with different I/O write numbers, where the greater the I/O write numbers, the darker the colors. It can be seen from the abscissa of sub-FIG. 502 that the daily I/O write time is mainly concentrated in interval periods every other 6 hours. It can be seen from the ordinate of sub-FIG. 502 that there is not much regularity in the difference in the I/O write numbers between different days.

Continuing referring to FIG. 5, sub-FIG. 506 is an I/O presentation in weeks, the abscissa is days of each week, the ordinate is weeks, and sub-FIG. 508 is a comparison chart of the colors and the I/O write numbers to indicate the colors associated with different I/O write numbers, where the greater the I/O write numbers, the darker the colors. It can be seen from the abscissa of sub-FIG. 506 that there is not much regularity in the difference in the I/O write numbers between different days. It can be seen from the ordinate of sub-FIG. 506 that there is not much regularity in the difference in the I/O write numbers between different weeks.

It can be seen that sub-FIG. 502 is relatively intuitive, while sub-FIG. 506 is not intuitive. Therefore, for this file system, only sub-FIG. 502 may be selected to be presented to the user. After seeing presentation 500 in FIG. 5, the user may choose to create snapshots for the file system in the interval periods every other 6 hours, because no I/O write exists in these periods, normal running of the file system will not be affected.

Figure 6:
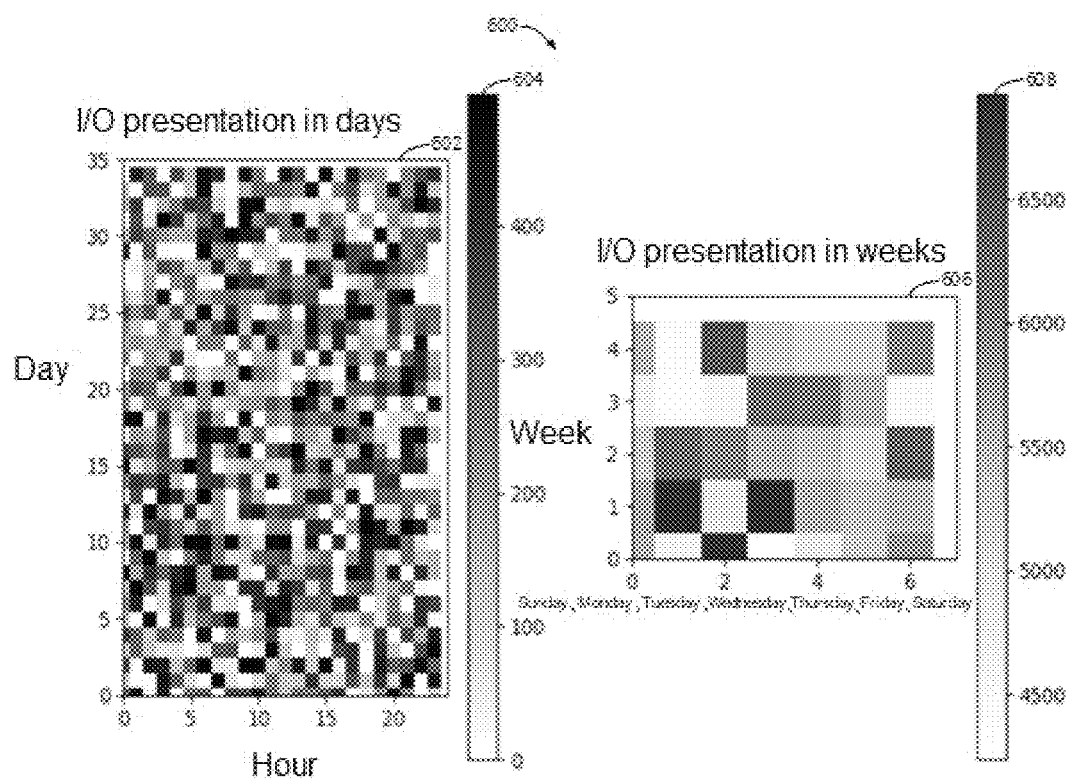
FIG. 6 shows a schematic diagram of I/O write record presentation 600 according to an embodiment of the present disclosure.

FIG. 6 shows a schematic diagram of I/O write record presentation 600 according to an embodiment of the present disclosure. According to the embodiment of the present disclosure, presentation 600 is aimed at a situation where the predetermined I/O write mode is a random arbitrary write operation.

As shown in FIG. 6, sub-FIG. 602 is an I/O presentation in days, the abscissa is hours of each day, the ordinate is days, and sub-FIG. 604 is a comparison chart of the colors and the I/O write numbers to indicate the colors associated with different I/O write numbers, where the greater the I/O write numbers, the darker the colors. It can be seen from the abscissa of sub-FIG. 602 that there is not much regularity in the difference in the I/O write numbers between different hours. It can be seen from the ordinate of sub-FIG. 602 that there is not much regularity in the difference in the I/O write numbers between different days.

Continuing referring to FIG. 6, sub-FIG. 606 is an I/O presentation in weeks, the abscissa is days of each week, the ordinate is weeks, and sub-FIG. 608 is a comparison chart of the colors and the I/O write numbers to indicate the colors associated with different I/O write numbers, where the greater the I/O write numbers, the darker the colors. It can be seen from the abscissa of sub-FIG. 606 that there is not much regularity in the difference in the I/O write numbers between different days. It can be seen from the ordinate of sub-FIG. 606 that there is not much regularity in the difference in the I/O write numbers between different weeks.

It can be seen that sub-FIG. 602 and sub-FIG. 606 are both not intuitive. Therefore, for this file system, sub-FIG. 602 or sub-FIG. 606 can be arbitrarily selected to be presented to the user, so that the user can understand the I/O write situation for this file system. After seeing presentation 600 in FIG. 6, the user may randomly choose to create snapshots for the file system, because no matter in what time period the snapshots are created, the normal running of the file system may be affected.

With reference to FIG. 1 to FIG. 6, relevant content has been described above regarding environment 100 for presenting I/O write records, in which a device and/or a method according to an embodiment of the present disclosure may be implemented, method 200 for presenting I/O write records according an embodiment of the present disclosure, method 300 for presenting I/O write records according to an embodiment of the present disclosure, I/O write record presentation 400 according to an embodiment of the present disclosure, I/O write record presentation 500 according to an embodiment of the present disclosure, and I/O write record presentation 600 according to an embodiment of the present disclosure. It should be understood that the above description is intended to better demonstrate the content recorded in the embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes can be arbitrarily set as needed without affecting the normal implementation of the embodiments of the present disclosure.

Through the above descriptions with reference to FIG. 1 to FIG. 6, according to the technical solutions of the embodiments of the present disclosure, the solution for presenting the I/O write records is provided, and in the solution, changes in the I/O write numbers over time can be presented to a user in a chronological, intuitive, and easily recognizable manner, so that the user can easily find a changing law of the I/O write numbers over time, and can further select data protection forms and schedules to be adopted, thereby improving the user experience of the user with needs for data analysis and data protection.

Figure 7:
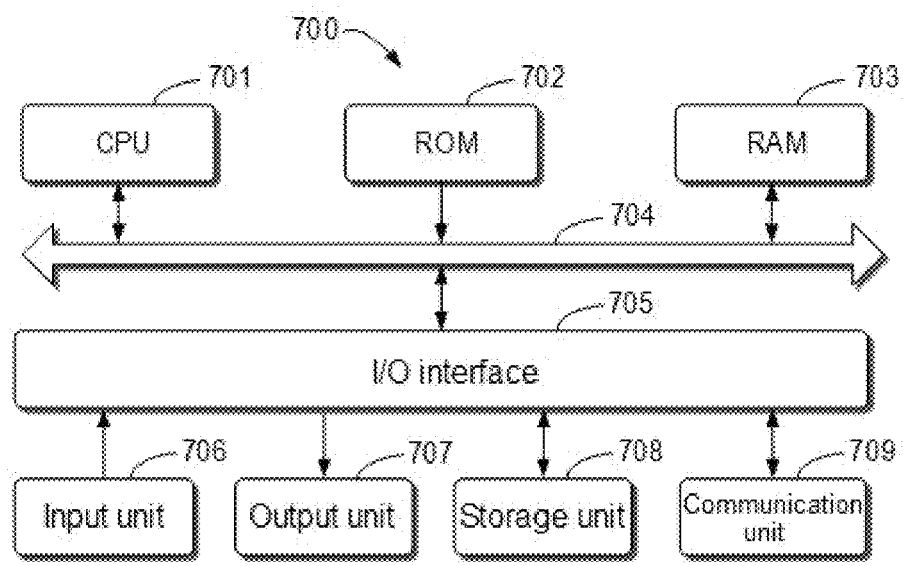
FIG. 7 shows a schematic block diagram of example device 700 that can be used to implement an embodiment of the present disclosure.

FIG. 7 illustrates a schematic block diagram of example device 700 that can be used to implement an embodiment of the present disclosure. According to the embodiment of the present disclosure, computing device 110 in FIG. 1 may be implemented by device 700. As shown in the figure, device 700 includes central processing unit (CPU) 701 that may perform various appropriate actions and processing according to computer program instructions stored in read-only memory (ROM) 702 or computer program instructions loaded from storage unit 708 into random access memory (RAM) 703. In RAM 703, various programs and data required for the operation of device 700 may also be stored. CPU 701, ROM 702, and RAM 703 are connected to one another through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

The various processes and processing described above, such as methods 200 and 300, may be performed by processing unit 701. For example, in some embodiments, methods 200 and 300 may be implemented as a computer software program that is tangibly included in a machine-readable medium such as storage unit 708. In some embodiments, part or all of the computer program may be loaded and/or installed to device 700 via ROM 702 and/or communication unit 709. One or more actions of methods 200 and 300 described above may be performed when the computer program is loaded into RAM 703 and executed by CPU 701.

The embodiments of the present disclosure may relate to a method, a device, a system, and/or a computer program product. The computer program product may include a computer-readable storage medium on which computer-readable program instructions for performing various aspects of the embodiments of the present disclosure are carried.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the embodiments of the present disclosure may be assembly instructions, instruction set architecture (ISA) instructions, machine instructions, machine-related instructions, microcode, firmware instructions, state setting data, or source code or object code written in any combination of one or more programming languages, where the programming languages include object-oriented programming languages, such as Smalltalk and C++, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user's computer over any kind of networks, including a local area network (LAN) or a wide area network (WAN), or may be connected to an external computer, for example, connected through the Internet by using an Internet service provider. In some embodiments, an electronic circuit, for example, a programmable logic circuit, a field programmable gate array (FPGA), or a programmable logic array (PLA), is personalized by utilizing state information of the computer-readable program instructions, where the electronic circuit may execute computer-readable program instructions so as to implement various aspects of the embodiments of the present disclosure.

Various aspects of the embodiments of the present disclosure are described here with reference to the flowcharts and/or block diagrams of the methods, the devices/systems, and the computer program products according to the embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for presenting input/output (I/O) write records, comprising:
    obtaining I/O write records for a file system within a time period;
    dividing the time period into a plurality of consecutive sub-time-periods based on a predetermined time interval;
    determining a plurality of I/O write numbers associated with the plurality of sub-time-periods based on the I/O write records; and
    graphically presenting the plurality of I/O write numbers in chronological order;
    wherein presenting the plurality of I/O write numbers comprises:
    determining a plurality of colors associated with the plurality of I/O write numbers; and
    graphically presenting the plurality of I/O write numbers by using the plurality of colors in chronological order.

2. The method according to claim 1, wherein obtaining the I/O write records comprises:
    obtaining the I/O write records from performance index records for the file system.

3. The method according to claim 1, wherein determining the plurality of I/O write numbers comprises:
    determining the plurality of I/O write numbers associated with the plurality of sub-time-periods by using aggregate sampling based on the I/O write records and the plurality of sub-time-periods.

4. The method according to claim 1, wherein a depth of a color among the plurality of colors is associated with a size of a corresponding I/O write number among the plurality of I/O write numbers.

5. The method according to claim 1, wherein graphically presenting the plurality of I/O write numbers by using the plurality of colors comprises:
graphically presenting the plurality of I/O write numbers by graphically presenting the plurality of I/O write numbers by using the plurality of colors according to at least one of following forms:
lines with colors;
two-dimensional graphs with colors; and
three-dimensional graphs with colors.

6. The method according to claim 1, wherein presenting the plurality of I/O write numbers further comprises:
weighting the plurality of I/O write numbers according to a predetermined weighting pattern, the predetermined weighting pattern being associated with time; and
graphically presenting the plurality of weighted I/O write numbers.

7. The method according to claim 1, further comprising:
determining the predetermined time interval based on a predetermined I/O write mode, the predetermined I/O write mode indicating a time during which I/O write is allowed.

8. The method according to claim 1, wherein the predetermined time interval is a first predetermined time interval, the plurality of sub-time-periods are a plurality of first sub-time-periods, the plurality of I/O write numbers are a plurality of first I/O write numbers, and the method further comprises:
dividing the time period into a plurality of consecutive second sub-time-periods based on a second predetermined time interval, the second predetermined time interval being different from the first predetermined time interval;
determining a plurality of second I/O write numbers associated with the plurality of second sub-time-periods based on the I/O write records; and
graphically presenting the plurality of first I/O write numbers and the plurality of second I/O write numbers in an associated mode in chronological order.

9. An electronic device, comprising:
at least one processing unit; and
at least one memory coupled to the at least one processing unit and storing instructions for execution by the at least one processing unit, wherein the instructions, when executed by the at least one processing unit, cause the device to perform actions comprising:
obtaining input/output (I/O) write records for a file system within a time period;
dividing the time period into a plurality of consecutive sub-time-periods based on a predetermined time interval;
determining a plurality of I/O write numbers associated with the plurality of sub-time-periods based on the I/O write records; and
graphically presenting the plurality of I/O write numbers in chronological order;
wherein presenting the plurality of I/O write numbers comprises:
determining a plurality of colors associated with the plurality of I/O write numbers; and
graphically presenting the plurality of I/O write numbers by using the plurality of colors in chronological order.

10. The electronic device according to claim 9, wherein obtaining the I/O write records comprises:
obtaining the I/O write records from performance index records for the file system.

11. The electronic device according to claim 9, wherein determining the plurality of I/O write numbers comprises:
determining the plurality of I/O write numbers associated with the plurality of sub-time-periods by using aggregate sampling based on the I/O write records and the plurality of sub-time-periods.

12. The electronic device according to claim 9, wherein a depth of a color among the plurality of colors is associated with a size of a corresponding I/O write number among the plurality of I/O write numbers.

13. The electronic device according to claim 9, wherein graphically presenting the plurality of I/O write numbers by using the plurality of colors comprises:
graphically presenting the plurality of I/O write numbers by graphically presenting the plurality of I/O write numbers by using the plurality of colors according to at least one of following forms:
lines with colors;
two-dimensional graphs with colors; and
three-dimensional graphs with colors.

14. The electronic device according to claim 9, wherein presenting the plurality of I/O write numbers further comprises:
weighting the plurality of I/O write numbers according to a predetermined weighting pattern, the predetermined weighting pattern being associated with time; and
graphically presenting the plurality of weighted I/O write numbers.

15. The electronic device according to claim 9, wherein the actions further comprise:
determining the predetermined time interval based on a predetermined I/O write mode, the predetermined I/O write mode indicating a time during which I/O write is allowed.

16. The electronic device according to claim 9, wherein the predetermined time interval is a first predetermined time interval, the plurality of sub-time-periods are a plurality of first sub-time-periods, the plurality of I/O write numbers are a plurality of first I/O write numbers, and the actions further comprise:
dividing the time period into a plurality of consecutive second sub-time-periods based on a second predetermined time interval, the second predetermined time interval being different from the first predetermined time interval;
determining a plurality of second I/O write numbers associated with the plurality of second sub-time-periods based on the I/O write records; and
graphically presenting the plurality of first I/O write numbers and the plurality of second I/O write numbers in an associated mode in chronological order.

17. A computer program product having a non-transitory computer readable medium which stores a set of instructions to present input/output (I/O) write records; the set of instructions, when carried out by computerized circuitry, causing the computerized circuitry to perform a method of:
obtaining I/O write records for a file system within a time period;
dividing the time period into a plurality of consecutive sub-time-periods based on a predetermined time interval;

determining a plurality of I/O write numbers associated with the plurality of sub-time-periods based on the I/O write records; and graphically presenting the plurality of I/O write numbers in chronological order;

wherein presenting the plurality of I/O write numbers comprises:

determining a plurality of colors associated with the plurality of I/O write numbers; and graphically presenting the plurality of I/O write numbers by using the plurality of colors in chronological order.

18. The computer program product according to claim 17, wherein obtaining the I/O write records comprises:

obtaining the I/O write records from performance index records for the file system.

19. The computer program product according to claim 17, further comprising:

determining the predetermined time interval based on a predetermined I/O write mode, the predetermined I/O write mode indicating a time during which I/O write is allowed.

20. A method for presenting input/output (I/O) write records, comprising:

obtaining I/O write records for a file system within a time period;

dividing the time period into a plurality of consecutive sub-time-periods based on a predetermined time interval;

determining a plurality of I/O write numbers associated with the plurality of sub-time-periods based on the I/O write records;

graphically presenting the plurality of I/O write numbers in chronological order; and determining the predetermined time interval based on a predetermined I/O write mode, the predetermined I/O write mode indicating a time during which I/O write is allowed.

* * * * *